Figure 1:
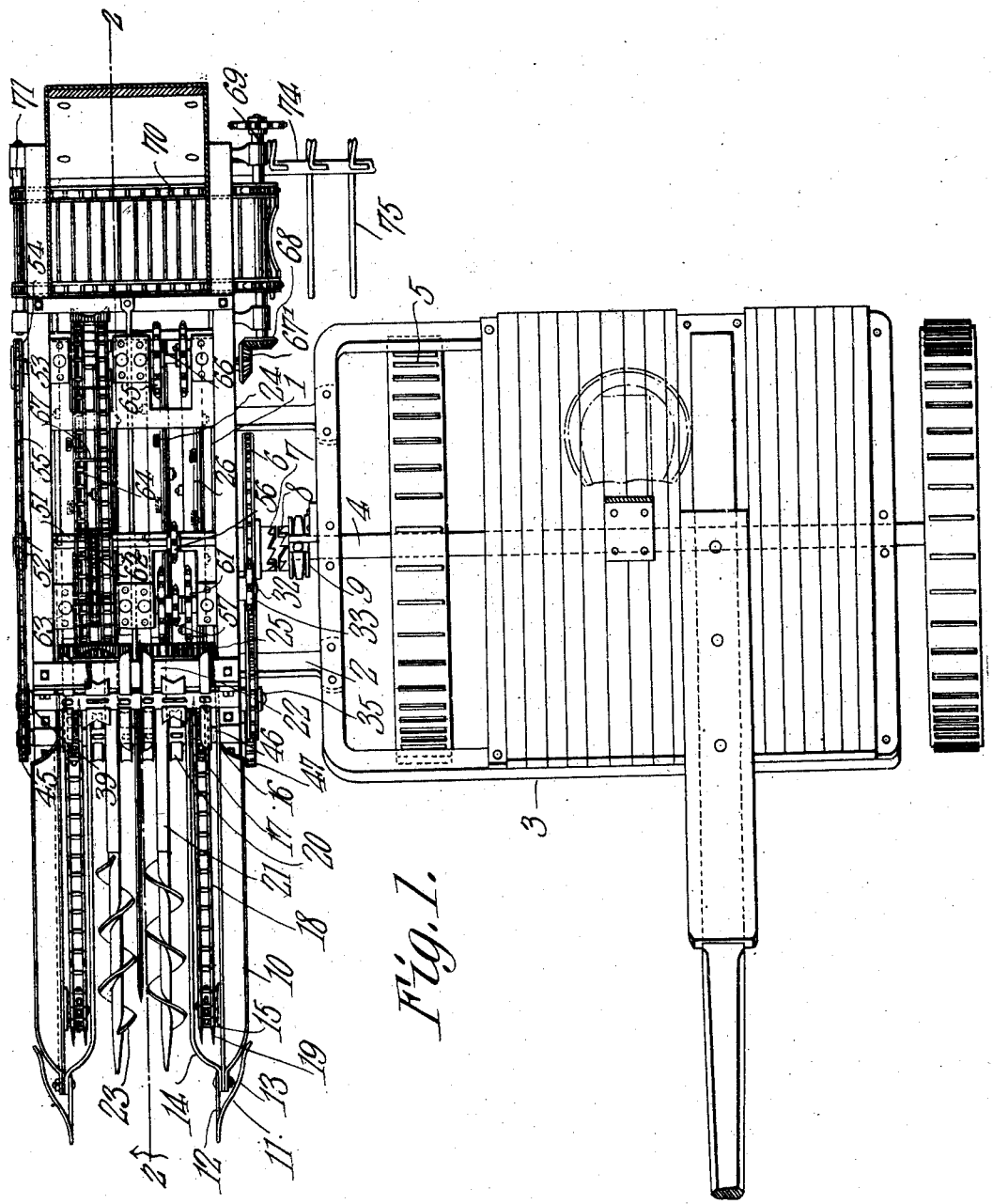

No. 882,734.

PATENTED MAR. 24, 1908.

I. J. BALL.

CORN HARVESTER AND HUSKER.

APPLICATION FILED MAY 15, 1907.

4 SHEETS—SHEET 1.

WITNESSES:

Irving J. Ball,
INVENTOR.

By C. A. Snow & Co.
ATTORNEYS

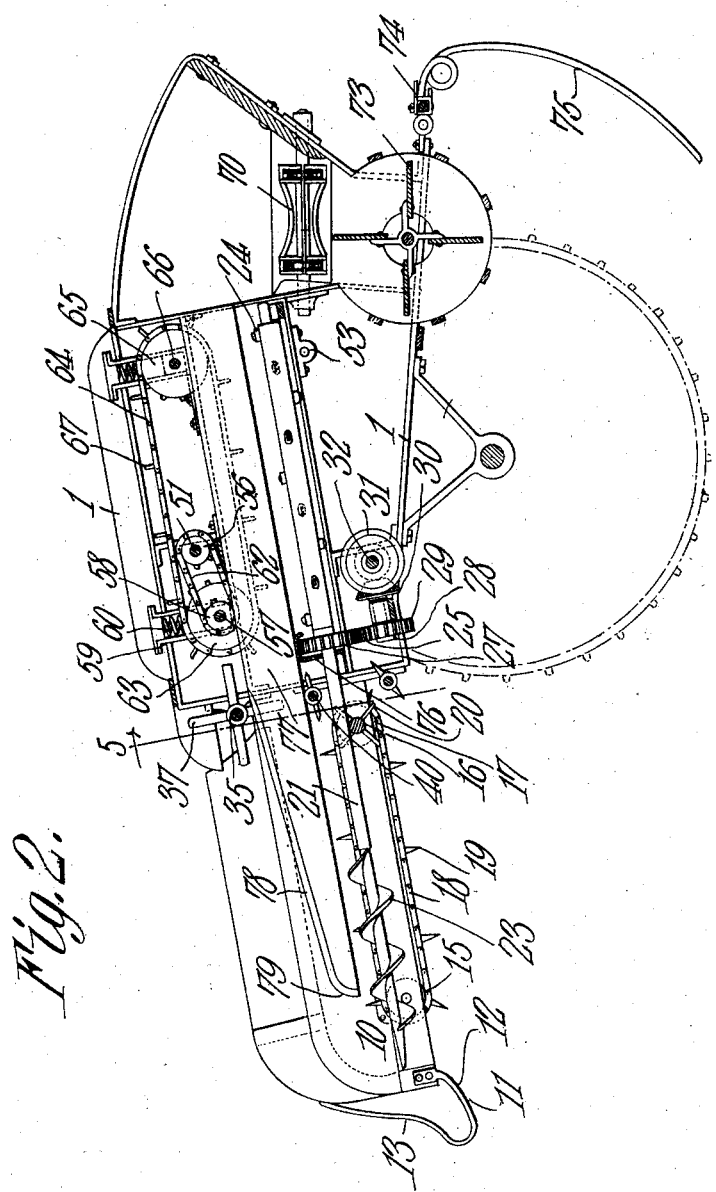

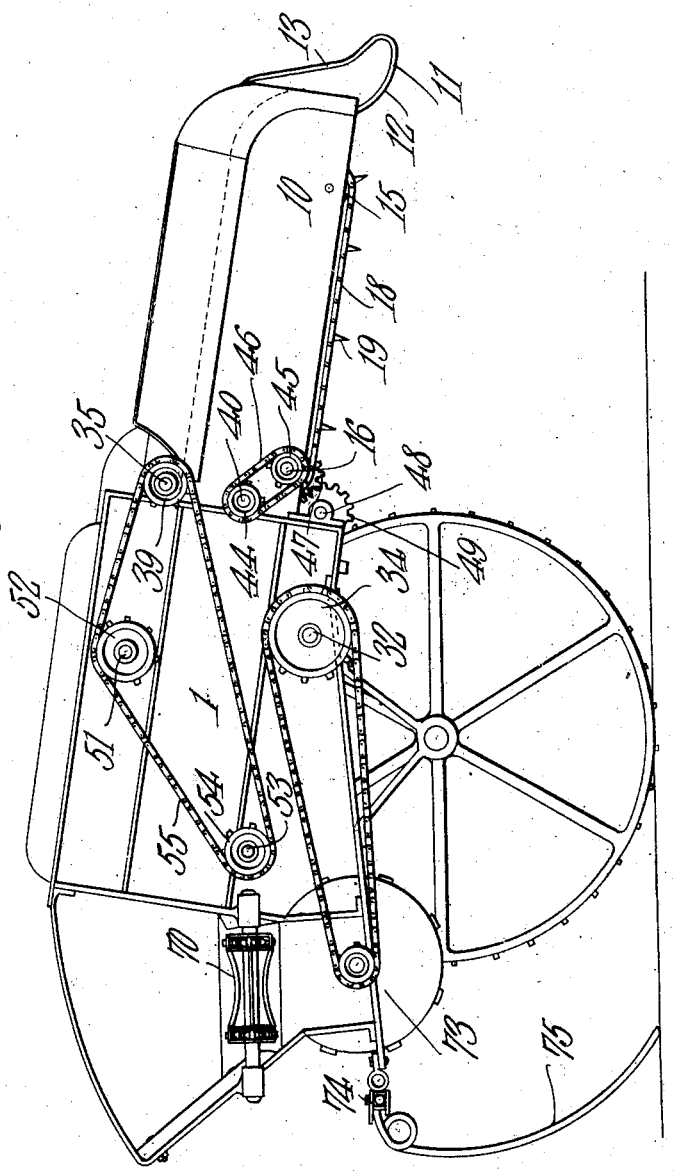

No. 882,734. PATENTED MAR. 24, 1908.
I. J. BALL.
CORN HARVESTER AND HUSKER.
APPLICATION FILED MAY 15, 1907.
4 SHEETS—SHEET 4.
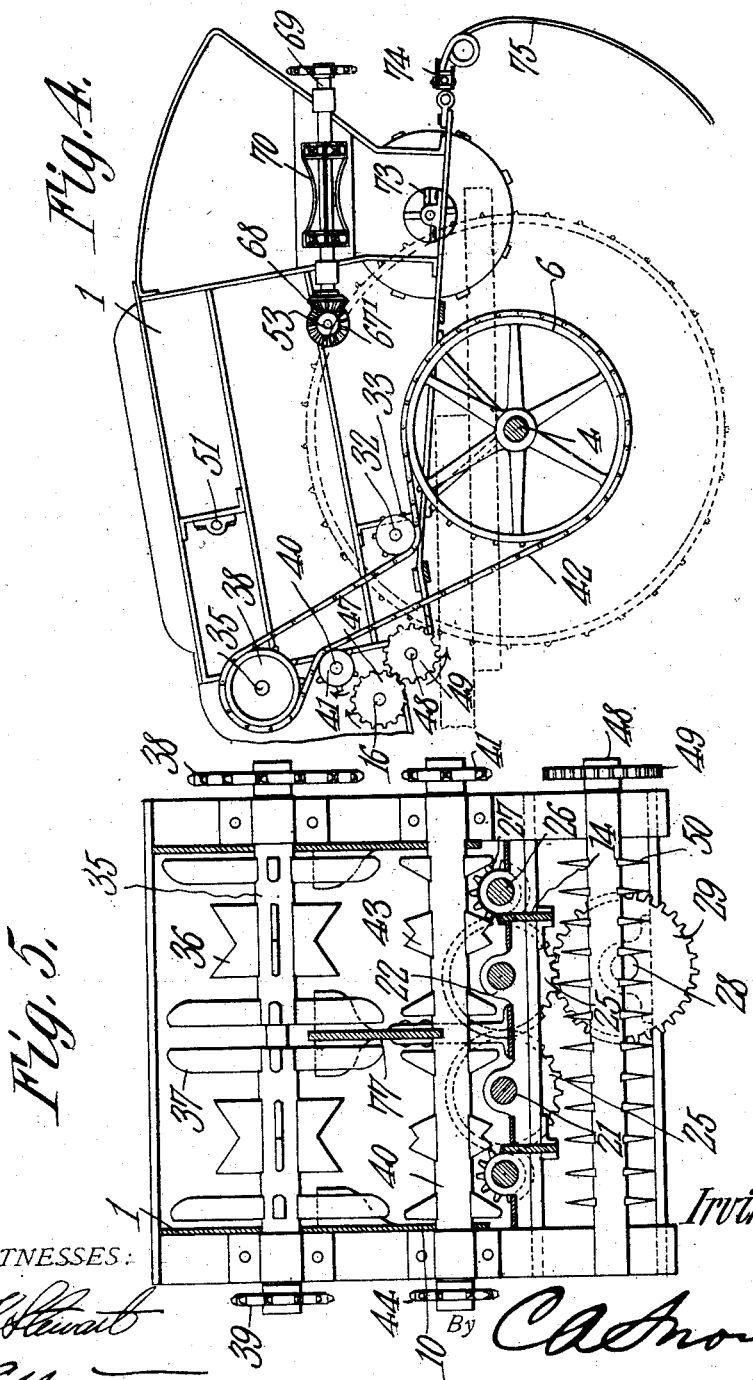
WITNESSES:
Irving J. Ball,
INVENTOR
By C. A. Snow & Co.
ATTORNEYS

UNITED STATES PATENT OFFICE.

IRVING J. BALL, OF BROCK, NEBRASKA.

CORN HARVESTER AND HUSKER.

No. 882,734.

Specification of Letters Patent.

Patented March 24, 1908.

Application filed May 15, 1907. Serial No. 373,769.

*To all whom it may concern:*

Be it known that I, IRVING J. BALL, a citizen of the United States, residing at Brock, in the county of Nemaha and State of Nebraska, have invented a new and useful Corn Harvester and Husker, of which the following is a specification.

This invention has relation to corn harvesters and huskers and it consists in the novel construction and arrangement of its parts as hereinafter shown and described.

The object of the invention is to provide an apparatus of the character indicated which is adapted to be drawn over the field and which is provided with gathering rolls of peculiar construction which are adapted to receive between them the stalks of corn and which coöperate with each other and adjacent side ribs for removing the lower ears from the stalks. The said rolls are journaled for rotation and at their rear ends are continued into husking rolls which coöperate with each other and adjacent husking rolls for removing husks from the ears after they have been delivered to the said husking rolls. Means is provided for rotating the said rolls and which is operatively connected with the traction wheels of the apparatus. A series of conveyers is mounted for movement longitudinally of the gathering rolls and at the rear ends of the gathering rolls a series of snapping elements is journaled for rotation and coöperate with the gathering rolls in removing the upper ears of corn from the stalks. The said snapping elements are also connected with the said traction wheel. The frame of the apparatus is principally mounted upon the axle of the said traction wheels and the frame of the gathering and husking mechanism is applied to one side of the first said frame and forms a lateral extension of the same without other support, consequently, there is no side draft of the apparatus except that which is caused by the rolls operating upon the stalks.

In the accompanying drawings:—Figure 1 is a top plan view of the corn gatherer and husker with parts removed. Fig. 2 is a vertical sectional view of the same cut on the line 2—2 of Fig. 1. Fig. 3 is a side elevation of the same. Fig. 4 is an elevation of the rear portion of the opposite side of the same, and Fig. 5 is a transverse sectional view of the corn gatherer cut on the line 5—5 of Fig. 2.

The gatherer and husker consists of the frame 1 which is mounted upon the laterally disposed arms 2 attached to the frame 3. The frame 3 is supported upon the axle 4 which, in turn, is supported by and rotates with the traction wheels 5. The sprocket wheel 6 is mounted upon an extended end of the axle 4 and is provided with a clutch hub 7 which is adapted to coöperate with a clutch member 8 slidably mounted upon the said axle. A lever or equivalent device 9 is provided for moving the clutch member 8 along the axle 4. The extremity of the axle 4 is journaled to the frame 1 and the said axle, together with the arms 2, constitute the only supports for the said frame 1.

The frame 1 is provided with a pair of parallel side bars 10 which extend substantially the entire length of the gathering and husking mechanism to be described hereinafter. The said bars are preferably formed from angle iron. The rods 11 are attached to the forward ends of the bars 10 and are of peculiar configuration. The said rods constitute lifters and have the forwardly and downwardly inclined sections 12 and the upwardly, outwardly and rearwardly inclined sections 13. The ribs 14 are attached at their forward ends to the bars 10 and at their rear portions are spaced from the said bars but extend parallel with the same. The sprocket wheels 15 are journaled between the forward portions of the bars 10 and the ribs 14 and the shaft 16 is journaled at the rear portions of the ribs 14 and extends transversely of the said ribs and the bars 10. The sprocket wheels 17 are mounted upon the shaft 16 and are located between the bars 10 and ribs 14. The chains 18 pass around the alined sprocket wheels 15 and 17 and are provided at intervals along their lengths with the teeth or prongs 19. The said chains 18 constitute conveyers and through the actuation of the shaft 16 their upper sides are moved toward the rear ends of the ribs 14. The snapping blades 20 are radially mounted upon the shaft 16 and are located between the ribs 14.

The rolls 21 are journaled in the bearings 22 and extend parallel to each other and to the side bars 10. The bearings 22 are located approximately midway between the ends of the said rolls and the forward portions of the rolls form corn gatherers while the rear portions of the said rolls form or operate as corn huskers. The forward ends of the rolls 21 are slightly tapered with pointed extremities, said taper extending substantially from a point midway between the bearings 22 and the forward ends of the rolls. The volute flanges 23 surround the forward or tapered portions of the said rolls and consequently extend for about half the distance between the bearings 22 and the pointed ends of the rolls. The rear portions of the rolls 20 are provided with the radially disposed husking pegs 24 which are arranged in spiral lines along the rolls. The gear wheels 25 are fixed to the rolls 21 and mesh with each other. The husking rolls 26 are located adjacent and parallel with the husking ends of the rolls 21 and are provided with husking pegs similar to the pegs 24. The relatively small gear wheels 27 are fixed to the rolls 26 and mesh with the larger gear wheels 25. The stub shaft 28 is journaled for rotation under the rolls 21 and the gear wheel 29 is mounted upon the said shaft and meshes with one of the gear wheels 25. The beveled pinion 30 is also mounted upon the shaft 28 and meshes with the beveled pinion 31 which is mounted upon the transversely disposed shaft 32. The sprocket wheel 33 is fixed to one end of the shaft 32 and lies in the same plane with the sprocket wheel 6. The sprocket wheel 34 is fixed to the opposite end of the said shaft 32. The ear snapping shaft 35 is journaled in the upper portion of the frame 1 substantially over the rear ends of the gathering portions of the rolls 21. Said shaft is provided with the ear snapping paddles 36 and the snapping blades 37. The said paddles 36 being located between the blades and being shorter than the blades. The sprocket wheel 38 is fixed to one end of the shaft 35 and lies in the same plane with the sprocket wheels 33 and 6. The sprocket wheel 39 is fixed to the opposite end of the shaft 35.

The ear snapping shaft 40 is journaled in the frame 1 immediately below the shaft 35. The sprocket wheel 41 is fixed to one end of the shaft 40 and lies in the same plane with the sprocket wheels 6, 32 and 38. The sprocket chain 42 passes around the sprocket wheels 6 and 38 and has lateral contact with the sides of the wheels 33 and 41. Consequently, as the wheel 6 is rotated the shafts 32, 35 and 40 receive rotary motion. The shaft 35 rotating in the same direction as the wheel 6 and the shafts 40 and 32 rotating in the opposite direction. The shaft 40 is provided with the diminutive snapping paddles 43 which are radially disposed upon the said shaft and coöperate with the paddles 36 and blades 37 on the shaft 35 in removing the ears from the upper portions of the stalks. The end of the shaft 40 opposite to that end having the wheel 41 is provided with a sprocket wheel 44 and one end of the shaft 16 is provided with a sprocket wheel 45 located in alinement with the wheel 44. The sprocket chain 46 passes around the wheels 44 and 45 and consequently the conveyers 18 receive their movement through the sprocket chain and wheels just mentioned. The opposite end of the shaft 16 is provided with a gear wheel 47. A snapping shaft 48 is located below the shaft 40 and is provided at one end with a gear wheel 49 which meshes with the gear wheel 47. The shaft 48 is provided with the radially disposed snapping pins 50. The shaft 48 rotates in the opposite direction to the shaft 40 and the pins 50 are adapted to impale the stalks and draw the same down under the frame 1 as the upper ears are removed by the paddles 43, 36 and blades 37. The shaft 51 is journaled in the upper portion of the frame 1 and extends transversely across the husking mechanism. Said shaft is provided at one end with a sprocket wheel 52 which is in alinement with the sprocket wheel 39 on shaft 35. The shaft 53 is also journaled to the frame 1 and extends transversely under the same. The sprocket wheel 54 is mounted on the shaft 53 in alinement with the sprocket wheel 52. The sprocket chain 55 passes around the sprocket wheels 39, 52 and 54. The sprocket wheels 56 are mounted on the shaft 51 and are located above the rolls 26 and the rear end portions of the rolls 21. The stub shafts 57 are journaled in the bearings 58 which are slidably mounted in the guides 59. The coil springs 60 bear at their upper ends against fixed portions of the frame 1 and bear at their lower ends against the bearings 58. The sprocket wheels 61 are fixed to the stub shafts 57 and the sprocket chains 62 pass around the sprocket wheels 56 and 57. The sprocket wheels 63 are also located on the shafts 57 and the sprocket chains 64 pass around the sprocket wheels 63 and the sprocket wheels 65 fixed on the stub shafts 66. The shafts 66 are mounted in bearings similar to the bearings 58 and the said bearings are also held down by springs similar to 60. The cross slats 67 connect the chains 64 together and the said slats extend transversely of the husking rolls and are adapted to carry the ears along the same.

The shaft 53 is provided at its end, opposite to that end having the wheel 54 with a beveled pinion 67'. The pinion 67' meshes with a pinion 68, also beveled, which is mounted upon the shaft 69. The conveyer belt 70 passes around the shaft 69 and the shaft 71 journaled at the opposite sides of the frame 1. When the husks have been removed from the ears of corn the said ears are deposited upon the conveyer 70, from which conveyer they may be delivered to other conveyers (not shown) and conveyer to any desired point. The fan 73 is journaled for rotation below the conveyer 70 and the husking rolls and is adapted to blow the particles of husks from the ears. The bar 74 is located at the rear of the apparatus and is provided with a series of rake tines 75. The shield 76 is attached to the frame 1 and extends over the gear wheels 25 and 27 as illustrated in Fig. 2. The said shield prevents the stalks or ears from interfering with the operation of the said gear wheel. The partition 77 extends longitudinally of the gathering and husking mechanism and is located above the same. The forward portion of the upper edge of the said partition is downwardly inclined and sharpened as at 78 and is adapted to cut the tops of the stalks when the same becomes entangled. The forward extremity of the said partition is curved downwardly and sharpened as at 79.

From the foregoing description it is obvious that as the apparatus is drawn along a row of stalks and the stalks are received between the side bars 10 the volute flanges 23 of the gathering rolls will operate upon the lower ears of corn and break the same from the stalks and throw them upon the chain conveyers 18. The said conveyers will carry the said ears back to the husking rolls. As the upper portions of the stalks are engaged by the snapping paddles and blades the upper ears are whipped and torn from the stalks and thrown back upon the husking rolls. The two outside husking rolls rotate at a greater rate of speed than the two intermediate rolls, owing to the difference in diameter of the gear wheels 23 and 27, consequently, the ears are rotated as they are operated by the husking pegs in order to present all surfaces to the said blade for the removal of the husks. At the same time, the ears are moved longitudinally of the husking rolls by the slats 67 which are held in resilient contact with the same by the springs 60.

Having described the invention what I claim as new and desire to secure by Letters-Patent is:—

1. A corn gatherer comprising rolls and rotating ear-snapping mechanism located transversely above the rolls.

2. A corn gatherer comprising rolls, bars located at the sides thereof and lifters attached to the ends of the bars, said lifters having forwardly extending portions and upwardly, outwardly and rearwardly extending portions.

3. A corn gatherer comprising rolls, a knife located above the rolls and having its cutting edge inclined toward the rolls.

4. A corn gatherer comprising rolls, ear snapping mechanism coöperating with the same, a knife located above the rolls and having its edge portion disposed away from the rolls.

5. A corn gatherer comprising rolls, conveyers operating at the sides of the rolls, a shaft for actuating the conveyers and ear snapping elements carried by said shaft.

6. A corn harvester comprising rolls, ear snapping mechanism located above the rolls and stalk engaging mechanism located below the rolls.

7. A corn harvester comprising rolls, shafts located above the rolls and carrying ear snapping elements, and a shaft located below the rolls and carrying stalk impaling elements.

8. A corn harvester comprising rolls, shafts journaled above the rolls, one of the said shafts carrying relatively large snapping elements and the other shaft carrying relatively small snapping elements.

9. A corn harvester comprising rolls, ear snapping mechanism located above the rolls and stalk impaling pins rotating about an axis below the rolls.

10. A corn harvester comprising gathering rolls the ends of which merge into husking rolls, supplemental husking rolls journaled for rotation with the gathering rolls, and ear snapping mechanism located at the point of merger between the gathering and husking rolls.

11. A corn harvester comprising gathering rolls which merge into husking rolls and ear snapping mechanism operating at the point of merger.

12. A corn harvester comprising gathering rolls journaled for rotation and having their ends merging into husking rolls, supplemental husking rolls also journaled for rotation and deriving their movement from the gathering rolls but rotating at a different rate of speed, and ear snapping mechanism located at the point of merger of the gathering rolls with the husking rolls.

13. A corn harvester comprising gathering rolls having their ends merging into husking rolls, intermeshing gear wheels located at the points of merger between the gathering and husking rolls, a shield located over the wheels, and ear snapping mechanism located adjacent the said wheels.

In testimony that I claim the foregoing as my own, I have hereto affixed my signature in the presence of two witnesses.

IRVING J. BALL.

Witnesses:
FRED WRIGHT,
W. A. DOOLITTLE.